April 28, 1970 S. KOWALSKI ET AL 3,508,568
PRESSURE RESPONSIVE VALVES
Original Filed Nov. 5, 1964 2 Sheets-Sheet 1

INVENTORS
Slawomir Kowalski
Donald A. Worden
Alfred Tillman
BY Emery, Whittemore,
Sander & Graham.
ATTORNEYS.

United States Patent Office 3,508,568
Patented Apr. 28, 1970

3,508,568
PRESSURE RESPONSIVE VALVES
Slawomir Kowalski, Rockaway, Donald A. Worden,
Pompton Plains, and Alfred Tillman, Mount Tabor,
N.J., assignors to Marotta Valve Corporation,
Boonton, N.J., a corporation of New Jersey
Continuation of application Ser. No. 409,203, Nov. 5,
1964. This application Nov. 29, 1967, Ser. No. 686,644
Int. Cl. G05d 11/02
U.S. Cl. 137—116.3                                    10 Claims

ABSTRACT OF THE DISCLOSURE

This specification discloses a pressure regulator that employs a Belleville washer in place of the usual flexible diaphragm or sliding piston which responds to pressure changes. The washer serves the function of both a diaphragm and a spring. By tapering the washer to less thickness toward its center opening, a softer spring rate is obtained; and a center valve element is held against the washer without connection thereto so as not to interfere with free dishing movement of the washer. The sealing around the periphery of the washer includes a resilient ring just beyond the circumferential limit of the washer for freedom of dishing movement. A support of the washer flexes radially to eliminate friction and to leave the regulator extremely sensitive to pressure changes. The invention includes differential pressure regulators as well as the more usual fixed-delivery pressure type.

RELATED APPLICATIONS

This application is a continuation of application Ser. No. 409,203 filed Nov. 5, 1964 now abandoned.

BRIEF DESCRIPTION OF THE INVENTION

This invention relates to apparatus for operating a valve or other element in response to a change in pressure. More specifically, the invention relates to an improved combination of apparatus for sensing the pressure in a regulator.

One object of the invention is to provide improved apparatus for operating a valve to control flow of fluid in response to the pressure at a location other than that of the fluid pressure which the valve controls. Thus, the invention relates to pressure regulators for maintaining a desired delivery pressure but is not concerned merely with pressure relief valves where the operating pressure is that of the fluid of which the pressure must be relieved; but relief valve features may be combined with the regulators of this invention.

Another object of the invention is to provide pressure-regulating means having a tapered washer with a soft spring rate and which serves the dual function of a sensing element (which has usually been a piston or flexible diaphragm) and a reference force element (which has usually been a spring or pressure dome).

The invention can be embodied in a simple pressure regulator which operates a valve when necessary to maintain a reduced and substantially constant pressure on the delivery side of the regulator in spite of variations on the upstream or high-pressure side of the regulator. It can be used also for a differential pressure regulator where pressure of one fluid is regulated in accordance with variations in the pressure of another fluid, for example a regulation of oil pressure to maintain a substantially constant differential between the pressure of the oil and the pressure of a gas used in the same system. The invention can also be embodied in improved pressure-responsive apparatus for operating an electric switch, or for operating some other controller.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DETAILED DESCRIPTION OF INVENTION

Figure 1:
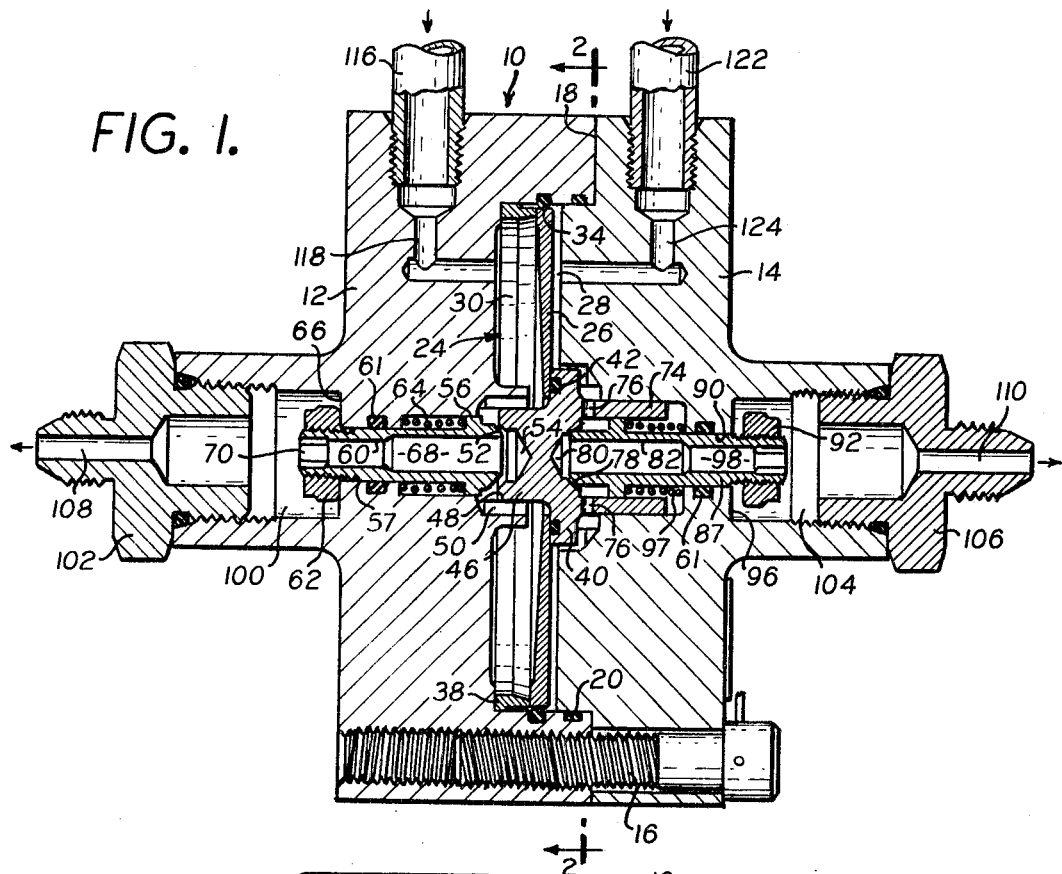
FIGURE 1 is a sectional view through a differential pressure regulator made in accordance with this invention.
Figure 2:
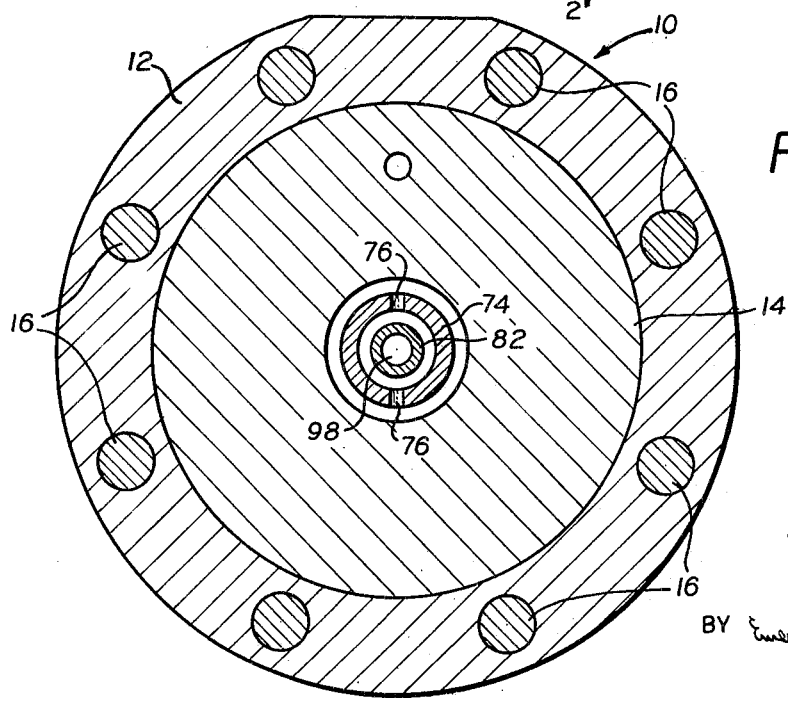
FIGURE 2 is a sectional view taken on the line 2—2 of FIGURE 1.

FIGURE 1 shows a regulator including a housing 10 having a left-hand portion 12 and a right-hand portion 14 connected together by detachable fastening means such as a ring of screws 16. The portion 14 of the housing extends into a counterbore in the portion 12 and has a shoulder 18 which fits against a confronting face of the portion 12 to limit the extent to which the portion 14 projects into the counterbore. A sealing ring 20 prevents leakage of fluid from within the housing where the portions 12 and 14 fit together.

The housing encloses a chamber 24 which is divided by a washer 26 into a first compartment 28 on the right-hand side of the washer 26 and a second compartment 30 on the left-hand side of the washer.

The washer 26 is made of stiffly flexible material, and preferably metal, so as to exert a spring action. The washer 26 tapers to a thinner cross section as it extends toward its center opening. This produces a softer spring rate. In the construction illustrated, the periphery of the washer 26 is not clamped between the portions 12 and 14 of the housing 10, but the outside diameter of the washer 26 is substantially equal to the inside diameter of the chamber 24 and there is a groove containing a sealing ring 34 around the circumference of the chamber 24 in position to contact with the periphery of the washer 26 so as to prevent leakage of fluid between the periphery of the washer 26 and the inside wall of the chamber 24.

This ring 34 extends beyond the sides of the chamber 24, and there is a radical clearance between the circumference of the washer 26 and the sides of the chamber to permit radial movement of the washer when it flexes.

The outer portion of the washer 26 contacts with a supporting ring 38 located on the left side of the washer; and there are valve means including an element 40 which contacts with the other side of the washer 26 over an area of the washer extending radially for a limited distance from the opening through the washer. A sealing ring 42, located in a groove in the element 40 prevents leakage of a fluid between the washer 26 and the element 40 during normal operation of the apparatus.

Support reaction force between the peripheral portion of the washer 26 and the supporting ring 38 is high. Sliding friction at this unit load would therefore be very high. A support ring reduces friction by flexing radially. The radial relative motion between the washer and the support is rotary with inherent low friction characteristics. Sliding movement in radial direction is completely eliminated.

The element 40 of the valve means has a center portion 46 extending through the opening in the center of the washer 26 and into a bearing 48 that serves as a guide for the element 40. This bearing 48 has slots 50 for the flow of fluid lengthwise along the bearing 48 in an axial direction.

The element 40 has a seat 52 around the upper edge of a counterbore 54. A valve 56 closes against the seat 52 to shut off flow of fluid at times in a manner which will be explained later. The valve 56 has a stem 57 which slides in a guide 60. An O-ring 61 in a circumferential groove in the guide 60 prevents leakage of fluid between the stem 57 and guide 60. There is a stop nut 62 threaded on the end of the stem 57 to limit the extent to which the valve 56 can move toward the right in FIGURE 1. A spring 64 urges the valve 56 toward the right and normally holds th stop nut 62 against a shoulder 66 of the housing.

The position of the valve 56, when the stop nut 62 is in contact with the shoulder 66, depends upon the axial position of the stop nut 62 on the threaded end of the valve stem 57. This is adjustable. A passage 68 extends through the full length of the valve 56, including the stem 57, and there is a hexagonal counterbore 70 at one end of the passage 68, for holding the valve stem with a tool while rotating the stop nut 62 one way or the other to adjust the position of the valve 56.

The element 40 of the valve means has a sleeve portion 74 extending toward the right in FIGURE 1 and there are radial passages 76 through which fluid can flow into the sleeve portion 74. There is another seat 78 around a counterbore 80 on the right hand side of the element 40 and at the inner end of the sleeve 74. A valve 82 is movable into and out of contact with the seat 78 to control flow of fluid in a manner which will be explained. This valve 82 has a stem 87 which slides in a guide bearing 90. A stop nut 92 threaded on the end of the valve stem 87 contacts with a shoulder 96 to limit the extent to which the valve 82 can move toward the left and there is a spring 97 urging the valve 82 toward the left. A passage 98 extends throughout the full length of the valve 82, including the length of the valve stem 87. This construction is similar to that already described for the valve 56.

The passage 68 through the valve 56 opens into a chamber 100 which has a fitting 102 screwed into its outer end for connection with piping or tubing of an external circuit. The passage 98 through the valve 82 opens into a chamber 104 into which a fitting 106 screws with provision for connection with piping or tubing of an outside circuit. In the intended operation of the differential regulator shown in FIGURE 1, passages 108 and 110 through the fittings 102 and 106, respectively, are outlet passages of the regulator.

An inlet pipe 116 communicates with an inlet passage 118 which opens into the compartment 30 of the chamber 24. Another pipe 122 communicates with an inlet passage 124 that opens into the first compartment 28 of the chamber 24. The operation of the apparatus shown in FIGURE 1 is as follows:

If the differential pressure regulator shown in FIGURE 1 is to be used for controlling pressure of a supply of oil in accordance with continuously variable pressure of a gas, the pipe 122 is connected with the gas line. The particular differential between oil pressure and gas pressure which the device will maintain depends upon the adjustment of the stop nuts 62 and 92. The pressure differential may be adjustable between 25 and 100 lbs. per square inch. The gas pressure may be between 1000 and 2000 lbs. These figures are given merely by way of illustration.

The gas pressure from the pipe 122 is exerted against the washer 26 in the compartment 28 and urges the washer 26 toward the left in FIGURE 1. The element 40 of the valve means is held against the washer 26 by the spring 97 as long as the valve 82 is closed against the seat 78. Pressure of oil in the pipe 116 is exerted against the washer 26 in the second compartment 30 and urges the washer 26 to move toward the right in FIGURE 1. As long as the gas pressure in the compartment 28 is adquate to hold the washer 26 toward the left so that the valve seat 52 remains closed against the valve 56, there is no escape of oil from the compartment 30 and the oil pressure remains undisturbed.

If there is a decrease in the gas pressure in the pipe 122 or if there is an increase in the oil pressure in the pipe 116 sufficient to cause the washer 26 to be moved by the oil pressure to the right so that the valve seat 52 moves away from the valve 56, then oil escapes from the compartment 30 past the open valve 56 and through the passage 68 and passage 108 to an oil return line. This escape of oil reduces the pressure of the oil in the pipe 116 and reduces the oil pressure which is to be controlled.

If the opposite sort of pressure change occurs, that is, the gas pressure 122 increases, or the oil pressure in the pipe 116 decreases, then the washer 26 is moved toward the left and the element 40 also moves toward the left as the result of pressure of the spring 97 and gas pressure that enters the space within the sleeve 74 through the opening 76. This gas pressure in the sleeve 74, if sufficient in magnitude, thrusts the element 40 toward the left even after the spring 97 has been expanded to the limit of travel permitted by the stop nut 92. Thus the valve seat 78 is moved away from the valve 82 so that the compartment 28 is put into communication with the passages 98 and 110 and gas escapes with resulting decrease in the pressure in the pipe 122. Thus the apparatus shown in FIGURE 1 varies the oil pressure or the gas pressure as necessary to maintain a set differential between the pressure of one with respect to the other.

Figure 3:
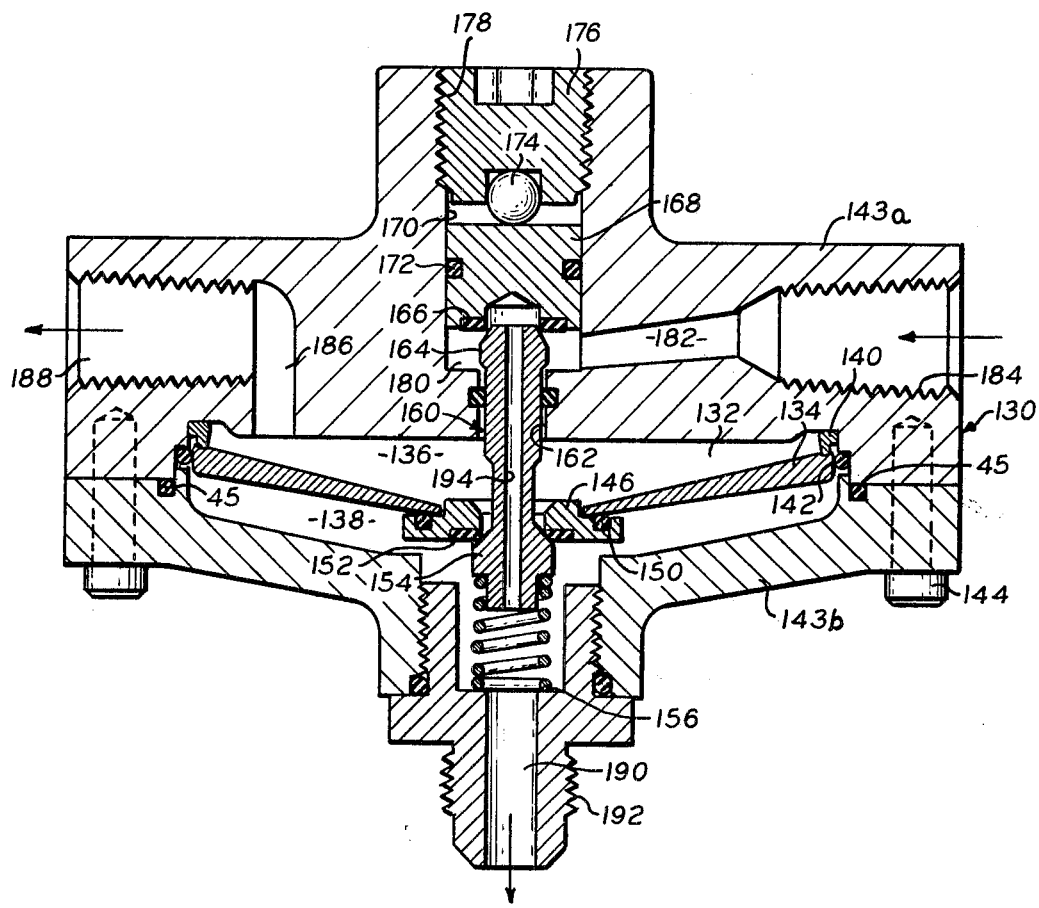
FIGURE 3 is a diagrammatic sectional view of a modified form of the invention comprising a combined pressure regulator and relief valve.

FIGURE 3 shows a modified form of the invention in which a regulator housing 130 encloses a chamber 132 containing a tapered washer 134 which divides the chamber 132 into an upper compartment 136 and a lower compartment 138. The tapered washer has its peripheral portion resting on a support ring 140 and there is a sealing ring 142 in a circumferential groove of the chamber 132 surrounding the circumference of the washer 134. This construction is similar to that desired in connection with FIGURE 1.

The housing 130 is made of two sections 143a and 143b secured together by screws 144 and with a static body seal 145.

An element 146 of a valve means extends into the center opening of the washer 134 and is held centered in the chamber 132 by the edge of the opening through the washer 134. This element 146 extends radially outward across a portion of the area of the washer 134 around the center opening and has a sealing ring 150 which contacts with the washer. There is a valve seat 132 carried by the element 146; and a valve 154 is urged against the seat 152 by a spring 156.

The valve 154 is part of the lower end of a valve element 160 which slides in a guide 162 and which has another valve 164 at its upper end.

This valve 164 closes against a seat 166 located on a plug 168 that is movable up and down in a guide 170. A sealing ring 172, located in a circumferential groove of the plug 168, is under light compression against the sides of the guide 170 so that friction holds the plug 168 in position. A metal ball 174 bears against the upper end of the plug 168 and can be pushed down to displace the plug by rotating a threaded plunger 176 in a threaded portion 178 at the upper end of the guide 170.

Thus the plug 168 can be pushed down into any desired set position by the threaded plunger 176 and the plug 168 can be moved upward by backing off the threaded plunger 176 so that pressure of the valve 164 and the gas in the space below the plug 168 will move the plug upward until it is again in contact with the metal ball 174.

The valve 164 is located in a chamber 180 to which gas is supplied through a passage 182 from an inlet opening 184 having threads for connection with a pipe leading to an outside circuit. The compartment 136 is connected by a passage 186 leading to a vent port 188 which is threaded for connection with a pipe of an outside circuit.

The housing 130 has an outlet port 190 through a fitting 192 screwed into the lower end of the housing and communicating with the compartment 138 below the washer 134. There is a passage 194 leading through the valve element 160.

The valve 164 is balanced as to pressure in the chamber 180. The valve 154 need not be balanced because the apparatus is designed to operate with a constant outlet pressure at the outlet port 190.

The operation of the apparatus shown in FIGURE 3 is as follows:

When pressure at the outlet port 190 is at the desired value, the pressure in the compartment 138 holds the washer 134 and the element 146 far enough up to permit the spring 156 to hold the valve 154 closed against the seat 152 and to hold the valve 164 closed against the seat 166. When there is a drop in pressure in the compartment 138 below the downstream pressure which the regulator is set to maintain, the spring force of the washer 134 moves the element 146 downward and moves the valve element 160 downward against the compression of the spring 156, and moves the upper valve 164 away from the valve seat 166 so that high pressure gas from the passage 182 and chamber 180 flows past the open valve 164 and down through the passage 194 until the pressure in the outlet port 190 and the compartment 189 builds up to the desired downstream pressure. When pressure is restored, the additional gas pressure in the compartment 138 under the washer 134 thrusts the washer upward and again closes the valve 164. The downstream pressure at which the valve 164 will open depends upon the adjustment of the plug 168 in the guide 170.

The construction shown in FIGURE 3 also includes a relief valve feature, the valve 154 functioning as a relief valve in the event that the downstream pressure in the outlet port 190 and compartment 138 exceeds a predetermined value, the gas will push the washer 134 and the element 146 upward away from the valve 154 which cannot rise because the upper valve 164 is already against its seat 166. Thus the seat 152 moves away from the valve 154 and opens a clearance for the escape of gas from the compartment 138 through the center opening of the element 146 and into the upper compartment 136 which vents through the passage 186 and vent port 188. When the excessive pressure is relieved, the spring force of the washer 134 causes it to move the element 146 and seat 152 downward to their original position with the seat 152 again in contact with the valve 154.

The preferred embodiments of the invention have been illustrated and described. It will be understood that the invention can be applied to other constructions where the tapered spring washer is a suitable operating element, for example in the operation of electric switches. Various changes and modifications can be made, and some features can be used in different combinations without departing from the invention as defined in the claims.

What is claimed is:

1. A pressure regulator including a housing enclosing a chamber, a washer dividing the chamber into first and second compartments, the pressure regulator having a delivery port in direct communication with the second compartment, the washer being stiffly flexible so as to function as a spring and being tapered to thinner cross section towards its center opening to obtain a softer spring rate, the washer being unclamped around its periphery for greater freedom of movement, valve means in the chamber including elements that move toward and from one another to close and open said valve means, the washer being operably connected with the valve means and having a bias in a direction to hold it in contact with the valve means by spring pressure of the washer itself, an inlet passage leading through a side of the housing into the chamber and commanded by the valve means, and resilient means opposing the spring pressure of the washer and urging the valve means into contact with the washer and in a direction to close said valve means.

2. The pressure regulator described in claim 1 characterized by a first element of the valve means located in the center opening of the washer and extending radially beyond the center opening and over an area of the washer outward from the center opening, said bias of the washer holding the washer in contact with the first element over said area and being the only force urging the washer into contact with said first element, said first element being held against the washer over a portion of said area by said resilient means, and said first element being held centered in the washer by contact with the edge of the center opening through the washer.

3. The pressure regulator described in claim 2 characterized by the first element of the valve means including a sealing ring covering the area of contact between the first element and said area of the washer over which said first element extends.

4. The pressure regulator described in claim 1 characterized by the outside diameter of the washer being substantially equal to the inside diameter of the chamber, and the washer being held centered in the chamber by the circumferential wall of the chamber, and a sealing ring having an inside diameter substantially equal to the outside diameter of the washer, the sealing ring being around the washer and in contact with the outside periphery thereof for preventing leakage of pressure between the periphery of the washer and the circumferential wall of the chamber.

5. The pressure regulator described in claim 1 characterized by there being an inlet passage for fluid opening into each compartment of the valve chamber and an outlet passage for fluid opening from each compartment, these passages including said two passages leading through sides of the housing, the first and second valve elements controlling the flow of fluids from the inlet to the outlet of one compartment, valve means on the other side of the washer for controlling the flow of fluid from the inlet to the outlet of the other compartment.

6. The pressure regulator described in claim 5 characterized by the first valve element being located in the center opening of the washer and extending radially beyond the center opening and over an area of the washer outward from the center opening, the first valve element closing the opening through the washer, recesses in the first valve element with valve seats around the outer edges of the recesses, a second valve element closing against the valve seat in one compartment, and a third valve element that closes against the valve seat in the other compartment, both of the second and third valve elements having axial passages therethrough constituting part of the passages through which fluid flows from the respective compartments.

7. The pressure regulator described in claim 6 characterized by springs urging the second and third valve elements toward the washer and their respective seats, adjustable stops limiting the movement of the second and third valve elements towards the washer, the first valve element having a range of movement with the washer sufficient to carry it beyond the limit of movement of each of the second and third valve elements, but being in contact with both the second and third valve elements during at least a portion of the range of movement of the washer.

8. A pressure regulator including a fixed housing enclosing a chamber, a flexible partition dividing the chamber into first and second compartments, valve means in the chamber including valve elements that move toward and from one another to close and open said valve means, there being an inlet for fluid opening into each compartment of the valve chamber, and an outlet passage for fluid opening from each compartment, the valve means including first and second valve elements in one compartment for controlling the flow of fluid from the inlet to the outlet of that compartment, said first valve element being located partly on both sides of the partition and, therefore, in both compartments, valve means on the other side of the partition for controlling the flow of fluid from the inlet to the outlet of the other compartment, recesses in the first valve element with valve seats around the outer edges of the recesses, the second valve element closing against the valve seat in one compartment, and the valve means in said other compartment including a third valve element that closes against the valve seat in said other compartment, both of the second and third valve elements having axial passages therethrough constituting part of the passages through which fluid flows from the respective compartments.

9. The pressure regulator described in claim 8 characterized by a spring urging each of the second and third valve elements toward the partition and their respective seats, adjustable stops limiting the movement of the second and third valve elements toward the partition, the first valve element having a range of movement with the partition sufficient to carry the seat for the second valve element beyond the range of movement of the second valve element, and the first valve element also having a range of movement with the partition sufficient to carry the seat for the third valve element beyond the range of movement of the third valve element, but the first valve element being in contact with both the second and third valve elements during at least a portion of the range of movement of the partition.

10. A pressure regulator including a cylindrical chamber, a washer dividing the chamber into first and second compartments, the washer being stiffly flexible so as to function as a spring, the diameter of the washer being less than the diameter of a circumferential wall of the cylindrical chamber for providing a radial clearance between the washer and the circumferential wall, a resilient sealing ring located in said clearance between the circumference of the washer and the wall of the cylindrical chamber for yieldably holding the washer centered in the chamber, a support for the washer under one side thereof, and located in one of said compartments and radially inward from the periphery of the washer, and means holding the washer firmly against said support, said support having an axially extending flange portion which is flexible in the direction of extent of the radius of the washer whereby the portion of the washer in contact with the support is radially displaceable as a unit with the contacting surfaces of the support to provide for radial movement of the washer incident to dishing movement thereof and without friction on the support.

References Cited

UNITED STATES PATENTS

| 2,089,144 | 8/1937 | Work | 137—116.5 |
| 2,704,548 | 3/1955 | Ralston | 137—469 |
| 2,748,791 | 6/1956 | Freeman | 137—111 |
| 3,109,442 | 11/1963 | Horowitz | 137—111 |
| 3,324,872 | 6/1967 | Cloud | 137—98 |

WILLIAM F. O'DEA, Primary Examiner

W. H. WRIGHT, Assistant Examiner

U.S. Cl. X.R.

137—112, 116.5, 510, 516.25